United States Patent
Yokomizo et al.

(10) Patent No.: US 10,760,013 B2
(45) Date of Patent: Sep. 1, 2020

(54) PROCESS AND APPARATUS FOR RECYCLING SLURRY HYDROCRACKED PRODUCT

(71) Applicant: UOP LLC, Des Plaines, IL (US)

(72) Inventors: Grant H. Yokomizo, Mount Prospect, IL (US); Ping Sun, Riverside, IL (US); Thomas J. Traynor, Vernon Hills, IL (US); Hans G. Lefebvre, Chicago, IL (US); Mark Van Wees, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/159,449

(22) Filed: Oct. 12, 2018

(65) Prior Publication Data

US 2019/0144766 A1 May 16, 2019

Related U.S. Application Data

(60) Provisional application No. 62/586,079, filed on Nov. 14, 2017.

(51) Int. Cl.
| | |
|---|---|
| *C10G 65/18* | (2006.01) |
| *C10G 47/26* | (2006.01) |
| *B01D 3/06* | (2006.01) |
| *B01D 3/14* | (2006.01) |
| *B01D 3/10* | (2006.01) |

(52) U.S. Cl.
CPC ............... *C10G 65/18* (2013.01); *B01D 3/06* (2013.01); *B01D 3/10* (2013.01); *B01D 3/143* (2013.01); *C10G 47/26* (2013.01); *B01D 2257/702* (2013.01); *C10G 2300/1044* (2013.01)

(58) Field of Classification Search
CPC C10G 47/26; C10G 65/18; C10G 2300/1044; B01D 3/06; B01D 3/143; B01D 3/10
See application file for complete search history.

(56) References Cited

PUBLICATIONS

WIPO translation of Okui et al (JP 2011084649) published Apr. 28, 2011.*
Google translation of Okui et al (JP 2011084649) published Apr. 28, 2011.*

* cited by examiner

*Primary Examiner* — Brian A McCaig
(74) *Attorney, Agent, or Firm* — Paschall & Associates, LLC; James C. Paschall

(57) ABSTRACT

Recycle of slurry hydrocracked product to a subsequent slurry hydrocracking reactor downstream of a lead slurry hydrocracking reactor produces reduced mesophase and provides better reactor stability as opposed to recycle to the lead slurry hydrocracking reactor. The recycle stream may be a vacuum bottoms stream and/or a slop wax stream from a fractionation column.

18 Claims, 2 Drawing Sheets

PROCESS AND APPARATUS FOR RECYCLING SLURRY HYDROCRACKED PRODUCT

CROSS-REFERENCE TO RELATED APPLICATION

This application claims priority from U.S. Provisional Application No. 62/586,079 filed Nov. 14, 2017, the contents of which cited application are hereby incorporated by reference in its entirety.

FIELD

The field is slurry hydrocracking heavy hydrocarbon streams.

BACKGROUND

Hydroprocessing includes processes which convert hydrocarbons in the presence of hydroprocessing catalyst and hydrogen to more valuable products.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

Slurry hydrocracking is a slurried catalytic process used to crack residue feeds to gas oils and fuels. Slurry hydrocracking is used for the primary upgrading of heavy hydrocarbon feed stocks obtained from the distillation of crude oil, including hydrocarbon residues or gas oils from atmospheric column or vacuum column distillation. In slurry hydrocracking, these liquid feed stocks are mixed with hydrogen and solid catalyst particles, e.g., as a particulate metallic compound such as a metal sulfide, to provide a slurry phase. Slurry hydrocracked effluent exits the slurry hydrocracking reactor at very high temperatures around 400° C. (752° F.) to 500° C. (932° F.). Representative slurry hydrocracking processes are described, for example, in U.S. Pat. Nos. 5,755,955 and 5,474,977.

During an SHC reaction, it is important to minimize coking. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate, or flocculate to form larger molecules, generate mesophase and form coke.

Solids in SHC product not dissolved by toluene include catalyst and toluene insoluble organic residue (TIOR). TIOR includes coke and mesophase and is heavier and less soluble than asphaltenes which are soluble in toluene but not heptane. Mesophase formation is a critical reaction constraint in slurry hydrocracking reactions. Mesophase is a carbonaceous, liquid-crystal material defined as anisotropic particles present in pitch boiling above 524° C. The presence of mesophase can serve as a warning that operating conditions are too severe in an SHC reactor and that excessive coke formation is likely to occur under prevailing conditions.

This coking can be minimized by the use of an additive or controlled by lowering reaction temperature. However, temperature reduction can also reduce conversion of poorer feeds. Adding a polar aromatic oil to the feedstock of a SHC reactor is effective in reducing the coke formation as described in U.S. Pat. No. 5,755,955. Furthermore, U.S. Pat. No. 6,004,453 describes such SHC processing with recycle of both heavy gas oil and unconverted pitch to enable the operation of the unit at a higher conversion, thus facilitating residue upgrading.

There is a continuing need, therefore, for improved processes and apparatuses for upgrading residue feed stocks in slurry hydrocracking and in suppression of mesophase production.

SUMMARY

We have found that recycle of slurry hydrocracked product to a subsequent slurry hydrocracking reactor downstream of a lead slurry hydrocracking reactor produces reduced mesophase and better yield of desirable products as opposed to recycle to the lead slurry hydrocracking reactor. The recycle stream may be a vacuum bottoms stream, a slop wax stream and/or a VGO stream from a fractionation column.

DEFINITIONS

Figure 1:
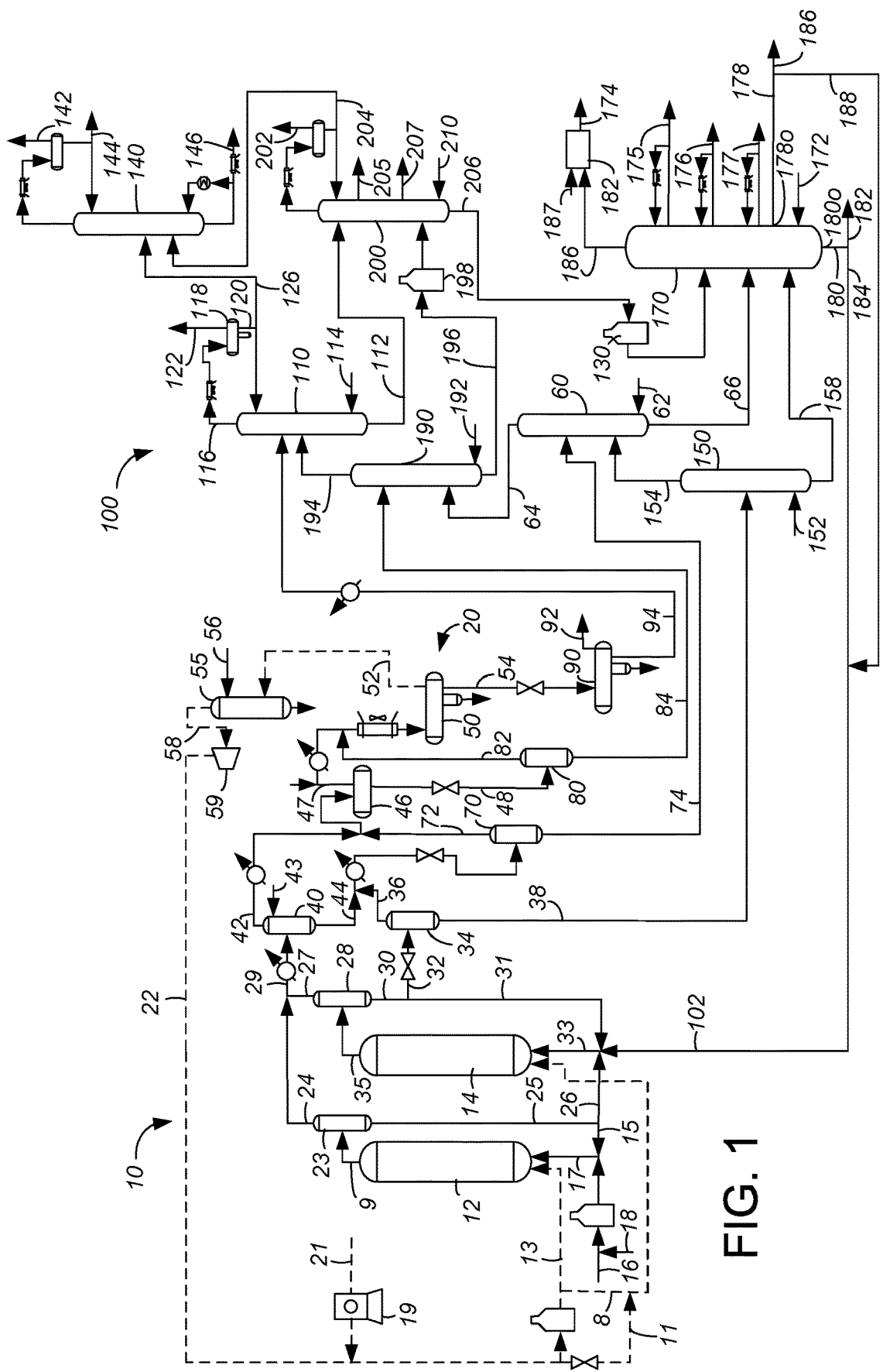
FIG. 1 is a simplified flow diagram.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 538° C. (1000° F.) AEBP as determined by any standard gas chromatographic simulated distillation method such as ASTM D2887, D6352 or D7169, all of which are used by the petroleum industry.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed that boils above the diesel cut point to material that boils at or below the diesel cut point in the diesel boiling range.

As used herein, "pitch conversion" means the conversion of materials boiling above 524° C. (975° F.) converting to material boiling at or below 524° C. (975° F.).

As used herein, "vacuum gas oil" means a hydrocarbon material having an IBP of at least about 232° C. (450° F.), a T5 of about 288° C. (550° F.) and about 392° C. (700° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residue" means a hydrocarbon material having an IBP of at least about 232° C. (450° F.), a T5 of about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

As used herein, "vacuum residuum" means the hydrocarbon material boiling with an IBP of at least 500° C. (932° F.).

As used herein, "heavy vacuum gas oil" means the hydrocarbon material boiling in the range between about 427° C. (800° F.) and about 538° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

The term "$C_x$" are to be understood to refer to molecules having the number of carbon atoms represented by the subscript "x". Similarly, the term "$C_{x-}$" refers to molecules that contain less than or equal to x and preferably x and less carbon atoms. The term "$C_x+$" refers to molecules with more than or equal to x and preferably x and more carbon atoms.

DETAILED DESCRIPTION

The subject embodiments can be applicable to slurry hydrocracking processes and apparatuses for heavy hydrocarbon feed streams that rely on recycle of heavier or unconverted product streams to the reactor to suppress generation of mesophase. SHC is one such hydroprocessing process, so the description will be directed to slurry hydrocracking although the application is not so limited.

The apparatus and process involves a hydroprocessing section 10, a separator section 20 and a fractionation section 100. The hydroprocessing section 10 can include at least two SHC reactors. Only two SHC reactors are illustrated in FIG. 1, a lead SHC reactor 12 and a subsequent SHC reactor 14. More subsequent SHC reactors 14 may be used, but only one subsequent SHC reactor 14 is illustrated in FIG. 1. The hydroprocessing section also includes a make-up gas compressor 19, a recycle gas scrubber 55 and a recycle gas compressor 59.

The heavy hydrocarbon feed stream 16 may include hydrocarbons boiling from about 340° C. (644° F.) to about 570° C. (1058° F.), an atmospheric residue, a vacuum residue, a tar, a bitumen, a coal oil, or a shale oil. A catalyst stream in catalyst line 18 may be combined with the heavy hydrocarbon feed stream in feed line 16 before heating to obtain a solids content of about 0.002 to about 10 wt %, preferably 0.01 to about 1 wt %, before being fed to the lead SHC reactor 12 in a lead feed line 17 after mixing with a recycle effluent stream in recycle effluent line 15. The catalyst line 18 may include a carrier liquid comprising light vacuum gas oil from a second product side line 176 or heavy vacuum gas oil from a third product side line 177 or streams such as those in line 16.

Typically, the slurry catalyst composition can include a catalytically effective amount of one or more compounds having iron or molybdenum. Particularly, the one or more compounds can include at least molybdenum in hydrocarbon, on carbon or on a support or one of an iron oxide, an iron sulfate, and an iron carbonate. Other forms of iron can include at least one of an iron sulfide, a pyrrhotite, and a pyrite. What is more, the catalyst can contain materials such as at least one of nickel and/or molybdenum, and/or a salt, an oxide, and/or a mineral thereof. Molybdenum in the slurry can be can have about 0.001 to 10 wt % of the catalytic active metal based on the total weight of the catalyst stream in line 18. Preferably, the one or more iron compounds include an iron sulfate, and more preferably, at least one of an iron sulfate monohydrate and an iron sulfate heptahydrate. Alternatively, one or more catalyst particles can include about 2 to about 45 wt % iron oxide and about 20 to about 90 wt % alumina such as bauxite. In another exemplary embodiment, it may be desirable for the catalyst to be supported. Such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, and vanadium, as well as sulfides of one or more of these metals. Generally, supported catalyst can have about 0.01 to about 30 wt % of the catalytic active metal based on the total weight of the catalyst.

Make-up hydrogen may be provided in line 21 to the make-up compressor 19. The compressor 19 may have up to five stages of compression and discharge a hydrogen stream at a pressure of 2 to about 24 MPa. The make-up hydrogen from the compressor 19 can supplement the recycle gas stream in a recycle gas line 22. A recycle hydrogen stream in the recycle gas line 22 may be split after heating to provide both a lead hydrogen stream in a lead hydrogen line 13 and a subsequent hydrogen stream in a subsequent hydrogen line 8. The subsequent hydrogen stream in the subsequent hydrogen line 8 can be supplemented with unheated recycle gas stream in supplemental gas line 11 taken from recycle gas line 22. The lead hydrogen stream in lead hydrogen line 13 taken from the recycle gas stream in the recycle gas line 22 can be fed to the lead SHC reactor 12 after heating.

A lead hydrocracked effluent stream exits the lead SHC reactor 12 in a lead effluent line 9 and may be separated in a lead effluent separator 23 to provide a vaporous hydrocracked effluent stream in a lead overhead line 24 extending from a top of the lead effluent separator 23 and a liquid hydrocracked effluent stream in a lead bottoms line 25 extending from a bottom of the lead effluent separator. The lead effluent separator 23 is operated at about the same temperature and pressure of the lead SHC reactor 12. The liquid effluent stream in the lead bottoms line 25 is split into the recycle effluent stream in the recycle effluent line 15 and a liquid feed effluent stream in a feed liquid effluent line 26 taken from the hydrocracked effluent stream in the lead effluent line 9. The recycle effluent stream in the recycle effluent line 15 is mixed with the lead SHC feed in the lead SHC feed line 16 and fed to the lead SHC reactor 12 in the lead feed line 17. It is also contemplated that lines 15 and 31 may be omitted to not recycle separated liquid back to the upstream reactor. In such an embodiment lead effluent separator 23 may also be omitted such that lead hydrocracked effluent stream in the lead effluent line 9 from the lead SHC reactor 12 cascades to the subsequent SHC reactor 14 without separation. The liquid feed effluent stream in the feed liquid effluent line 26 is mixed with a recycle separated stream in a recycle separated line 102 and a recycle subsequent effluent stream in a recycle subsequent effluent line 31 and fed in subsequent feed line 33 to the subsequent slurry hydrocracking reactor 14 in downstream communication with the lead SHC reactor 12. The lead hydrocracked effluent stream in the lead effluent line 9 may be charged to the subsequent slurry hydrocracking reactor 14 in the feed liquid effluent line 26 without separation in the lead effluent separator 23. The liquid feed effluent stream in the liquid feed effluent line 26 may be taken from the lead hydrocracked effluent stream in the lead effluent line 9. Moreover, the liquid feed effluent stream in the liquid feed effluent line 26 may be taken from the liquid effluent stream in the lead bottoms line 25. The subsequent hydrogen stream in the subsequent hydrogen line 8 and/or 11 taken from the recycle gas stream in the recycle gas line 22 can be fed to the subsequent SHC reactor 14. The lead slurry hydrocracking reactor 12 is out of downstream communication with the subsequent SHC reactor 14 through hydrocarbon carrying lines.

Generally, the lead SHC reactor 12 and the subsequent SHC reactor(s) 14 can operate at any suitable conditions, such as a temperature of about 400° C. (752° F.) to about 500° C. (932° F.) and a pressure of about 3 to about 24 MPa (a). Exemplary slurry hydrocracking reactors are disclosed in, e.g., U.S. Pat. Nos. 5,755,955; 5,474,977; US 2009/0127161; US 2010/0248946; US 2011/0306490; and US 2011/0303580. Often, SHC is carried out using reactor conditions sufficient to crack at least a portion of pitch in a heavy hydrocarbon feed stream in the heavy hydrocarbon feed line 16 to products boiling lower than pitch, such as gas oil, diesel, naphtha, and $C_1$-$C_4$ products. The lead SHC reactor 12 may operate at about 50 to about 90% conversion and the subsequent SHC reactor 14 may operate to achieve an overall conversion of about 90 to about 99% conversion, preferably between about 92 and about 97 wt % conversion.

A subsequent hydrocracked effluent stream exits the subsequent SHC reactor 14 in subsequent effluent line 35 and is fed to the separation section 20. The separation section 20 can include a hot separator 28, a wash oil separator 40, a warm separator 46, and a cold separator 50 which are all in downstream communication with the lead SHC reactor 12 and the subsequent SHC reactor(s) 14. In the separation section 20, the subsequent hydrocracked effluent stream may be separated in a hot separator 28 to provide a hot vapor stream in a hot overhead line 27 extending from a top of the hot separator 28 and a hot liquid stream in a hot bottoms line 30 extending from a bottom of the hot separator. The hot vapor stream in the hot overhead line 27 may mix with the vaporous hydrocracked effluent stream in the lead overhead line 24 and a mixed vapor effluent stream may be transported together in a mixed overhead line 29. The hot separator 28 is operated at about the same temperature and pressure of the subsequent SHC reactor 14. For example, the hot separator 28 can be operated at about 200° to about 500° C. and at a little less than the pressure of the lead SHC reactor 12 and the subsequent SHC reactor(s) 14 accounting for pressure drop through the lines. The hot liquid stream in the hot bottoms line 30 may be split into the recycle subsequent effluent stream in the recycle subsequent effluent line 31 and a process hot liquid stream in a process hot bottoms line 32. The recycle subsequent effluent stream in the recycle subsequent effluent line 31 may be mixed with the liquid feed effluent stream in a feed liquid effluent line 26 and the recycle separated stream in a recycle separated line 102 and be recycled to the subsequent SHC reactor 14 in subsequent feed line 33. The process hot liquid stream in the process subsequent effluent line 32 may be let down in pressure and fed to the hot flash drum 34.

The process hot liquid stream in the process hot bottoms line 32 may be provided to the hot flash drum 34 which separates the process hot liquid stream into a hot flash vapor stream in a hot flash overhead line 36 extending from a top of the hot separator 34 and a hot hydrocracked effluent stream in a hot flash bottoms line 38 extending from a bottom of the hot separator. The hot hydrocracked stream in the hot flash bottoms line 38 is taken from the lead hydrocracked effluent stream in the lead effluent line 9 and/or the subsequent hydrocracked effluent in the subsequent effluent line 35. The hot flash vapor stream in the hot flash overhead line 36 may be cooled and added to the wash oil flash drum 70. In an aspect, a wash oil bottoms stream in a wash oil bottoms line 44 may be let down in pressure, cooled and added to the wash oil flash drum. In an aspect, the hot flash vapor stream in the hot flash overhead line 36 and the wash oil liquid stream in the wash oil bottoms line 44 may be mixed, cooled and added to the wash oil flash drum 70 together. The hot flash liquid stream in the hot flash bottoms line 38 may be transported to the hot stripper column 150. The wash oil flash drum 70 may be in downstream communication with the wash oil separator 40.

The mixed vapor effluent stream may be transported together in a mixed overhead line 29, cooled and fed to a wash oil separator 40 separately or together. In the wash oil separator 40, the mixed vapor stream comprising the hot vapor stream in the hot overhead line 27 and the vaporous hydrocracked effluent stream in the lead overhead line 24 is contacted with a heavy hydrocarbon wash oil stream from wash oil line 43 entering the wash oil separator at an inlet above an inlet for the mixed vapor in mixed vapor line 29 to wash heavier materials from the mixed vapor stream. The wash oil separator 40 is in downstream communication with the wash oil line 43. The wash oil stream may be vacuum gas oil and preferably, heavy vacuum gas oil such as from the HVGO separated stream in a third product side line 177. The wash oil separator 40 separates the hot vapor stream in the hot separator overhead line 27 and the mixed vapor effluent stream in the subsequent overhead line 29 into a wash oil vapor stream in a wash oil separator overhead line 42 extending from a top of the wash oil separator 40 and a wash oil liquid stream in a wash oil bottoms line 44 extending from a bottom of the wash oil separator 40. The wash oil vapor stream in the wash oil overhead line 42 may be cooled and fed to a warm separator 46. The wash oil liquid stream in the wash oil bottoms line 44 which comprises a predominance of the wash oil stream in the wash oil line 43 may be mixed with the hot flash vapor stream in the hot flash overhead line 36, cooled and fed to the wash oil flash drum 70. The wash oil liquid stream and the hot flash vapor stream may also be separately fed to the wash oil flash drum 70. Often, the wash oil separator 40 can be operated at about 220 to about 450° C. and a little less pressure than the hot separator 28 accounting for pressure drop in the lines.

The warm separator 46 separates the wash oil vapor stream in the wash oil overhead line 42 and a warm flash vapor stream in a warm flash overhead line 72 into a warm vapor stream in a warm separator overhead line 47 extending from a top of the warm separator 40 and a warm liquid stream in a warm separator bottoms line 48 extending from a bottom of the warm separator. The warm separator 46 may be in downstream communication with the wash oil flash drum 70. A water stream may be added to the warm vapor stream in the warm overhead line 47, be cooled and fed to a cold separator 50. A warm flash vapor stream in a warm flash overhead line 82 may also be fed to the cold separator 50 with or separately from the warm vapor stream in the warm overhead line 47. The warm flash vapor stream in the warm flash overhead line 82 preferably mixes with the warm vapor stream in the warm overhead line 47 after the warm vapor stream is cooled in a heat exchanger and they together are cooled in an air cooler before entering the cold separator 50. The warm liquid stream in the warm bottoms line 48 may be let down in pressure and fed to the warm flash drum 80. Often, the warm separator 46 can be operated at about 170 to about 400° C. and at a little less pressure than the wash oil separator 40 accounting for pressure drop in the intervening lines.

The cold separator 50 separates the warm vapor stream in the warm separator overhead line 47 and the warm flash vapor stream in the warm flash overhead line 82 into a cold vapor stream in a cold separator overhead line 52 extending from a top of the cold separator 50 and a cold liquid stream in a cold separator bottoms line 54 extending from a bottom of the cold separator. Condensed water may be removed in a boot from the cold separator 50. Generally, the cold separator 50 can be operated at no more than about 100° C., preferably no more than about 70° C. and at least 50° C. The separators 28, 40, 46 and 50 all operate at a little less than the pressure of about the lead SHC reactor 12 and the subsequent SHC reactor(s) 14 accounting for pressure drop through the lines. The separator liquid streams in lines 32, 44, 48 and 54, can be provided as hot hydrocracked, wash oil hydrocracked, warm hydrocracked and cold hydrocracked streams to the fractionation section 100, respectively. The hot separator 28 is in downstream communication with the lead SHC reactor 12 and the subsequent SHC reactor(s) 14.

The wash oil separator 40 is in downstream communication the lead SHC reactor 12, the subsequent SHC reactor(s) 14, the hot separator 28 and the hot overhead line 27. The warm separator 46 is in downstream communication the lead SHC reactor 12 and the subsequent SHC reactor(s) 14, the hot separator 28, the hot overhead line 27, the wash oil separator 40, wash oil overhead line 42, the hot flash drum 34, the hot flash overhead line 36, the wash oil flash drum 70, and the wash oil flash overhead line 72. The cold separator 50 is in downstream communication with the lead SHC reactor 12, the subsequent SHC reactor(s) 14, the hot separator 28, the hot overhead line 27, the wash oil separator 40, the wash oil overhead line 42, the hot flash drum 34, the hot flash overhead line 36, the wash oil flash drum 70, the wash oil flash overhead line 72, the warm separator 46, the warm overhead line 47, the warm flash drum 80 and the warm flash overhead line 82. The hot separator 28, the wash oil separator 40, the warm separator 46 and the cold separator 50 are used to reduce the temperature of the hydrocracked effluent while separating gases from liquids.

In addition, hydrogen gas can be recycled within the hydroprocessing section 10. Particularly, a cold vapor stream in the cold overhead line 52 can be obtained from the cold separator 50. The hydrogen gas in the cold vapor stream can be cleaned by contact with a lean amine stream 56 and obtained as a top stream in line 58 from a recycle gas scrubber 55. The top stream in line 58 can be sent to the recycle gas compressor 59 to provide a recycle hydrogen stream 22 to the lead SHC reactor 12 and the subsequent SHC reactor(s) 14.

The separator section 20 can also optionally include the hot flash drum 34, the wash oil flash drum 70, the warm flash drum 80 and the cold flash drum 90. The hot flash drum 34 can receive the process hot liquid stream in the process hot bottoms line 32 from the hot separator 28, so is in downstream communication with the hot separator 28 and the lead SHC reactor 12 and the subsequent SHC reactor(s) 14. The hot flash drum 34 flashes the hot liquid stream in the process hot bottoms line 32 at lower pressure to separate a hot flash vapor stream in a hot flash overhead line 36 extending from a top of the hot flash drum 34 from a hot flash liquid stream in a hot flash bottoms line 38 extending from a bottom of the hot flash drum. The hot flash liquid stream in the hot flash bottoms line 38 is at a temperature between about 200° and about 500° C. and a pressure of between about 350 and about 6,200 kPa which represent the conditions in the hot flash drum 34. The hot flash liquid stream in the hot flash bottoms line 38 may be transported to the hot stripper 150.

The wash oil flash drum 70 can receive a wash oil liquid stream in the wash oil bottoms line 44 from the wash oil separator 40. Moreover, the hot flash vapor stream in the hot flash overhead line 36 from the hot flash drum 34 can be cooled and provided to the wash oil flash drum 70. Consequently, the wash oil flash drum 70 is in downstream communication with the hot flash drum 34, the hot flash overhead line 36, the wash oil separator 40, the wash oil bottoms line 44, the hot separator 28, and the lead SHC reactor 12 and the subsequent SHC reactor(s) 14. The wash oil flash drum 70 flashes the wash oil liquid stream in the wash oil bottoms line 44 and the hot flash vapor stream in the hot flash overhead line 36 at lower pressure to separate a wash oil flash vapor stream in a wash oil flash overhead line 72 extending from a top of the wash oil flash drum 70 from a wash oil hydrocracked stream in a wash oil flash bottoms line 74 extending from a bottom of the wash oil flash drum 70. The wash oil hydrocracked stream in the wash oil flash bottoms line 74 is taken from the lead hydrocracked effluent stream in the lead effluent line 9 and/or the subsequent hydrocracked effluent in the subsequent effluent line 35. The wash oil flash vapor stream in the wash oil flash overhead line 72 can be transported to a warm separator 46. The wash oil flash liquid stream in the wash oil flash bottoms line 74 is at a temperature between about 220° and about 450° C. and a pressure of between about 350 and about 6,200 kPa which represent the conditions in the wash oil flash drum 70. The wash oil flash liquid in the wash oil flash bottoms line 74 may be transported to the wash oil stripper 60.

The warm flash drum 80 can receive a warm liquid stream in the warm bottoms line 48 from the warm separator 46. Consequently, the warm flash drum is in downstream communication with the hot flash drum 34, the wash oil separator 40, the warm separator 46, the warm bottoms line 48, the hot separator 28, the lead SHC reactor 12 and the subsequent SHC reactor(s) 14. The warm flash drum 80 flashes the warm liquid stream in the warm separator bottoms line 48 at lower pressure to separate a warm flash vapor stream in a warm flash overhead line 82 extending from a top of the warm flash drum 80 from a liquid warm hydrocracked stream in a warm flash bottoms line 84 extending from a bottom of the warm flash drum 80. The warm hydrocracked stream in the warm flash bottoms line 84 is taken from the lead hydrocracked effluent stream in the lead effluent line 9 and/or the subsequent hydrocracked effluent in the subsequent effluent line 35. The warm hydrocracked stream in the warm flash bottoms line 84 is also taken from the warm liquid stream in the warm bottoms line 48. The warm flash vapor stream in the warm flash overhead line 82 can be transported to a cold separator 50 after cooling and perhaps after mixing with the warm vapor stream in the warm overhead line 47. The warm hydrocracked stream in the warm flash bottoms line 84 is at a temperature between about 170° and about 400° C. and a pressure of between about 350 and about 6,200 kPa which represent the conditions in the warm flash drum 70. The warm flash liquid stream in the warm flash bottoms line 84 can be transported to the warm stripper column 190. The warm stripper column may be in downstream communication with the warm separator 46.

The cold flash drum 90 can receive a cold liquid stream in the cold bottoms line 54 from the cold separator 50 after it is let down in pressure. Consequently, the cold flash drum 90 is in downstream communication with the cold separator 50, the cold bottoms line 54, the warm separator 46, the wash oil separator 40, the hot separator 28, the hot flash drum 34, the wash oil flash drum 70, the warm flash drum 80, the warm flash overhead line 82, the lead SHC reactor 12 and the subsequent SHC reactor(s) 14. The cold flash drum 90 flashes the cold liquid stream in the cold bottoms line 54 to separate a cold flash vapor stream comprising normally gaseous hydrocarbons in a cold flash overhead line 92 extending from a top of the cold flash drum 90 from a cold flash liquid stream in a cold flash bottoms line 94 extending from a bottom of the cold flash drum 90. The cold hydrocracked stream in the cold flash bottoms line 94 is taken from the lead hydrocracked effluent stream in the lead effluent line 9 and/or the subsequent hydrocracked effluent in the subsequent effluent line 35. The cold hydrocracked stream in the cold flash bottoms line 94 is also taken from the cold liquid stream in the cold bottoms line 54. The cold flash liquid stream in the cold flash bottoms line 94 is at a temperature of no more than about 100° C. and a pressure of between about 350 and about 6,200 kPa which represent the conditions in the cold flash drum 90. An aqueous stream may be removed from a boot in the flash drum 90. The cold flash liquid stream in the cold flash bottoms line 94 can be transported to the cold stripper column 110.

The hot flash drum 34, the wash oil flash drum 70, the warm flash drum 80 and the cold flash drum 90 are used to reduce the pressure of the hydrocracked effluent while separating gases from liquids. It is envisioned that one or all of the flash drums 34, 70, 80 and 90 can be dispensed with, so that the separator liquid streams 32, 44, 48 and 54 can be taken directly to the fractionation section 100.

In an embodiment, the fractionation section 100 may include a cold stripper column 110, a debutanizer column 140, a wash oil stripper column 60, a warm stripper column 190, a hot stripper column 150, a main fractionation column 200 and a product fractionation column 170. In accordance with this embodiment, the fractionation section 100 utilizes four separate stripper columns 110, 60, 190 and 150. The cold stripper column 110 strips the cold hydrocracked stream in the cold flash bottoms line 94, the warm stripper column 190 strips the warm hydrocracked stream in the warm flash bottoms line 84, the wash oil stripper column 60 strips the wash oil hydrocracked stream in the wash oil flash bottoms line 74 and a hot stripper column 150 strips the hot hydrocracked stream in the hot flash bottoms line 38. The cold stripper column 110 may be in downstream communication with the lead SHC reactor 12, the subsequent SHC reactor(s) 14, the cold separator 50 and the cold flash drum 90. The warm stripper column 150 may be in downstream communication with the lead SHC reactor 12, the subsequent SHC reactor(s) 14, the warm separator 46 and the warm flash drum 80. The wash oil stripper column 60 may be in downstream communication with the lead SHC reactor 12, the subsequent SHC reactor(s) 14, the wash oil separator 40 and the wash oil flash drum 70. The hot stripper column 150 may be in downstream communication with the lead SHC reactor 12, the subsequent SHC reactor(s) 14, the hot separator 28 and the hot flash drum 34.

The cold flash liquid stream in the cold flash bottoms line 94 may be heated and fed to the cold stripper column 110 near the top of the column. A warm stripper vapor stream in a warm stripper overhead line 194 may also be fed to the cold stripper column 110 at an inlet below the inlet for the cold flash bottoms line 94. The cold flash liquid stream in the cold flash bottoms line 94 bypasses the warm stripper column 190, the wash oil stripper column 60 and the hot stripper column 150. The cold flash liquid stream and the warm stripper vapor stream may be stripped in the cold stripper column 110 with a cold stripping media which is an inert gas such as steam from a cold stripping media line 114 to provide a cold stripper vapor stream of LPG, naphtha, hydrogen, hydrogen sulfide, steam and other gases in a cold stripper overhead line 116. At least a portion of the cold stripper vapor stream may be condensed and separated in a receiver 118. A net overhead line 122 from the receiver 118 carries vaporous off gas stream perhaps for further treating. A condensed cold overhead stream comprising unstabilized liquid naphtha from the bottoms of the receiver 118 in a condensed line 120 may be split between a reflux stream refluxed to the top of the cold stripper column 110 and a net condensed cold overhead stream which may be transported in a condensed cold overhead line 126 to further fractionation such as in the debutanizer column 140. The cold stripped stream in the cold stripped line 112 recovered from a bottom of the cold stripper column 110 comprises diesel that boils in the diesel boiling range and can be used as diesel blending stock without further fractionation. Alternatively, the cold stripped stream in the cold stripped line 112 may be fed to main fractionation column 200. The cold stripper column 110 may be operated with a bottoms temperature between about 149° C. (300° F.) and about 260° C. (500° F.) and an overhead pressure of about 0.5 MPa (g) (73 psig) to about 2.0 MPa (g) (290 psig). The temperature in the overhead receiver 118 ranges from about 38° C. (100° F.) to about 66° C. (150° F.) and the pressure is essentially the same as in the overhead of the cold stripper column 110.

The condensed unstabilized naphtha stream in the condensed cold overhead line 126 may be fed to the debutanizer fractionation column 140 which is in downstream communication with the lead SHC reactor 12 and the subsequent SHC reactor(s) 14 and the cold stripper column 110. A net condensed main stream in a net main overhead liquid line 204 may also be fed to the debutanizer column 140 at an inlet below that for the cold overhead line 126. The debutanizer column 140 fractionates the unstabilized naphtha and the net condensed main stream to provide a net off-gas stream in a net off-gas line 142, a net LPG stream comprising predominantly $C_4$-hydrocarbons in net debutanizer overhead line 144 and a naphtha stream comprising predominantly $C_5$+ hydrocarbons in a debutanized bottoms line 146. The debutanizer fractionation column may be operated at a top pressure of about 1034 kPa (g) (150 psig) to about 2758 kPa (g) (400 psig) and a bottom temperature of about 149° C. (300° F.) to about 260° C. (500° F.). The pressure should be maintained as low as possible to maintain reboiler temperature as low as possible while still allowing complete condensation with typical cooling utilities without the need for refrigeration.

The warm hydrocracked stream in the warm flash bottoms line 84 may be fed to a warm stripper column 190 near a top thereof. A wash oil stripper vapor stream in a wash oil stripper overhead line 64 may also be fed to the warm stripper column 190 at an inlet below the inlet for the warm flash bottoms line 84. The warm hydrocracked stream and the wash oil stripper vapor stream may be stripped in the warm stripper column 190 with a warm stripping media which is an inert gas such as steam from a warm stripping line 192 to provide a warm stripper vapor stream of diesel, naphtha, and other gases in the warm stripper overhead line 194 and a warm stripped stream in a warm stripped line 196 comprising diesel and VGO. The warm stripper column 190 may be operated with a bottoms temperature between about 170° C. (338° F.) and about 400° C. (752° F.) and an overhead pressure of about 0.5 MPa (g) (73 psig) to about 2.0 MPa (g) (290 psig).

At least a portion of the warm stripper vapor stream may be condensed and separated in a receiver. However, in an aspect, the warm stripper vapor stream in warm stripper overhead line 194 may be fed directly to the cold stripper column 110 with an inlet location below the inlet location of the cold flash bottoms line 94. Consequently, the cold stripper column 110 is in downstream communication with an overhead line 194 of the warm stripper column 190.

The warm stripped stream in the warm stripped line 196 taken from the bottom of the warm stripper column 190, may be heated in a fired heater 198 and fed to the main fractionation column 200 near a bottom thereof. The cold stripped stream in the cold stripped line 112 may also be fed to the main fractionation column 200. The main fractionation column 200 is in downstream communication with the lead SHC reactor 12, the subsequent SHC reactor(s) 14, the cold stripper column 110 and the warm stripper column 190. A main inert gas stream such as steam in a main inert gas line 210 may be used to provide heat to the main fractionation column 200. The main fractionation column 200 fractionates the warm stripped stream and the cold stripped stream to provide several separated streams including a net off-gas stream in line 202, a net condensed overhead stream comprising naphtha in net overhead line 204, a light main separated stream in a light side line 205 comprising light diesel, a heavy main separated stream in a heavy side line 207 comprising heavy diesel, and a main separated bottoms stream in an main bottoms line 206 containing VGO which may be further processed in an FCC unit or in a hydrocracking unit. In an alternative, the main separated bottoms stream in the main bottoms line 206 may be heated and fed to a product fractionation column 170. The main fractionation column may be operated at a top pressure of about 7 kPa (g) (1 psig) to about 345 kPa (g) (50 psig) and a bottom temperature of about 260° C. (500° F.) to about 399° C. (750° F.).

The wash oil hydrocracked stream in the wash oil flash bottoms line 74 may be fed to a wash oil stripper column 60 near a top thereof. A hot stripper vapor stream in a hot stripper overhead line 154 may also be fed to the wash oil stripper column 60 at an inlet below the inlet for the wash oil flash bottoms line 74. The wash oil hydrocracked stream and the hot stripper vapor stream may be stripped in the wash oil stripper column 60 with a wash oil stripping media which is an inert gas such as steam from a wash oil stripper line 62 to provide a wash oil vapor stream of diesel, naphtha, and other gases in the wash oil stripper overhead line 64 and a wash oil stripped stream in a wash oil stripped line 66 comprising diesel, VGO and pitch. The wash oil stripper column 60 may be operated with a bottoms temperature between about 170° C. (338° F.) and about 400° C. (752° F.) and an overhead pressure of about 0.5 MPa (g) (73 psig) to about 2.0 MPa (g) (290 psig).

At least a portion of the wash oil stripper vapor stream may be condensed and separated in a receiver. However, in an aspect, the wash oil stripper vapor stream in the wash oil overhead line 64 may be fed directly to the warm stripper column 190 with an inlet location below the inlet location of the warm flash bottoms line 84. Consequently, the warm stripper column 190 is in downstream communication with an overhead line 64 of the wash oil stripper column 190. The wash oil stripped stream in the wash oil stripped line 66 taken from the bottom of the wash oil stripper column 60, may be fed to the product fractionation column 170 near a bottom thereof without heating or at least without intense heating in a fired heater.

The hot hydrocracked stream in the hot flash bottoms line 38 may be fed to the hot stripper column 150. The hot hydrocracked stream may be stripped in the hot stripper column 150 with a hot stripping media which is an inert gas such as steam from a hot stripping line 152 to provide a hot vapor stripper stream of diesel, naphtha, hydrogen, hydrogen sulfide, steam and other gases in a hot stripper overhead line 154. At least a portion of the hot vapor stream may be condensed and separated in a receiver. However, in an aspect, the hot stripper overhead stream in the hot stripper overhead line 154 may be fed directly to the wash oil stripper column 60 with an inlet location below the inlet location of the warm hydrocracked stream in the warm flash bottoms line 74. The hot stripper column 150 may be operated with a bottoms temperature between about 160° C. (320° F.) and about 482° C. (900° F.) and an overhead pressure of about 0.5 MPa (g) (73 psig) to about 2.0 MPa (g) (292 psig).

A hydrocracked hot stripped stream is produced in a hot stripped line 158. At least a portion of the hydrocracked hot stripped stream in hot stripped line 158 may be fed to the product fractionation column 170 at an inlet location below the inlet for the wash oil stripped line 66. The product fractionation column 170 may operate at vacuum pressure for fractionation therein. Consequently, the product fractionation column 170 may be in downstream communication with the hot stripped line 158 of the hot stripper column 150. The hot stripped stream in the hot stripped line 158 taken from the bottom of the hot stripper column 150, may be fed to the product fractionation column 170 near a bottom thereof without heating or at least without intense heating in a fired heater.

The product fractionation column 170 may fractionate the hot stripped stream in the hot stripped line 158, the wash oil stripped stream in the wash oil stripped line 66 and the heated main bottoms stream in the main bottoms line 206 with a stripping media such as steam from product inert line 172 to provide several separated streams. The inlet for the main bottoms line 206 may be located above the inlet for the wash oil stripped line 66 which may be located above the inlet for the hot stripped line 158. The separated streams may include a light diesel separated stream in a net product overhead line 174, a heavy diesel separated stream in a first product side line 175 from a first side outlet, a light vacuum gas oil (LVGO) separated stream in a second product side line 176 from a second side outlet, a heavy vacuum gas oil (HVGO) separated stream in a third product side line 177 from a third side outlet, a slop wax separated stream in a fourth product side line 178 from a fourth side outlet 178o and a pitch separated stream in a product bottoms line 180 from a bottoms outlet 180o. Heat may be removed from the product fractionation column 170 by cooling the diesel separated stream in the first product side line 175, the LVGO separated stream in the second product side line 176 and the HVGO separated stream in line 177 and sending a portion of each cooled separated stream back to the product fractionation column 170.

In an aspect, the product fractionation column 170 may be operated as a vacuum column at less than atmospheric pressure. As such, the overhead light diesel separated stream in the net product overhead line 174 may be pulled from the product fractionation column 170 through a vacuum system 182 on an overhead line 186 of the product fractionation column 170. The vacuum system may include an eductor for generating a vacuum when a steam stream or other inert gas stream in an eductor line 187 is fed through the eductor. Alternatively, a vacuum pump may be used to pull a vacuum on the net overhead line 174. The product fractionation column 170 is maintained at a pressure between about 0.1 kPa (a) (1 torr (a)), and 6.7 kPa (a) (50 torr (a)), preferably between about 0.2 kPa (a) (1.5 torr (a)) and about 2.0 kPa (a) (15 torr (a)) and at a vacuum distillation temperature of about 300° C. (572° F.) to about 400° C. (752° F.) resulting in an atmospheric equivalent cut point between HVGO and pitch of between about 454° C. (850° F.) and about 593° C. (1100° F.), preferably between about 482° C. (900° F.), and about 579° C. (1075° F.), and most preferably between about 510° C. (950° F. and about 552° C. (1025° F.).

To suppress mesophase generation in the hydroprocessing section 10, a recycle separated stream may be recycled to the subsequent SHC reactor 14 while bypassing the lead SHC reactor 12. A recycle separated stream may be taken from one of the light diesel separated stream in the net overhead line 174, heavy diesel separated stream in the first product side line 175 from a side of the product fractionation column 170, the LVGO separated stream in the second product side line 176 from a side of the product fractionation column 170, the HVGO separated stream in the third product side line 177 from a side of the product fractionation column 170, the slop wax separated stream in the fourth product side line 178 from a side of the product fractionation column 170 and the pitch separated stream in a product bottoms line 180 from a bottom of the product fractionation column 170. The recycle separated stream may be also taken from one of the separated streams from the main fractionation column 200 including the light main separated stream in the light side line 205 from a side of the main fractionation column 200, the heavy main separated stream in the heavy side line 207 from a side of the main fractionation column 200, and the main separated bottoms stream in the main bottoms line 206 from a bottom of the main fractionation column 200.

In an embodiment, the recycle separated stream may be taken from a bottom of the product fractionation column 170. For example, the recycle separated stream may be taken from the pitch separated stream in a product bottoms line 180 from the bottom outlet 180o. The pitch separated stream in the product bottoms line 180 may be split into a pitch product stream in a pitch product line 182 and a pitch recycle separated stream in a pitch recycle line 184. The pitch recycle separated stream in a pitch recycle line 184 can provide the recycle separated stream in the recycle separated line 102 at least in part.

In another embodiment, the recycle separated stream may be taken from a side outlet of the product fractionation column 170. For example, the recycle separated stream may be taken from the slop wax separated stream in the fourth product side line 178 from a fourth side of the product fractionation column 170 from a side outlet 1780. The slop wax separated stream in the fourth product side line 178 may be split into an optional slop wax purge stream in a slop purge line 186 and a slop wax recycle separated stream in a slop wax recycle line 188. The slop wax recycle separated stream in the slop wax recycle line 188 can provide the recycle separated stream in the recycle separated line 102 at least in part. The recycle separated stream in the recycle separated line 102 may have a flow rate of about 5 to about 75 wt % of the flow rate of the heavy hydrocarbon feed stream in feed line 16.

The recycle separated stream in the recycle separated line 102 bypasses the lead SHC reactor 12 and is fed to the subsequent SHC reactor 14. If there is more than one subsequent SHC reactors 14, the recycle separated stream in the recycle separated line 102 bypasses the lead SHC reactor and is fed to one or more of the subsequent SHC reactors 14. The subsequent SHC reactor(s) 14 may be in downstream communication with a separator such as the hot separator 28, the wash oil separator 40, the warm separator 46, the cold separator 50, the hot flash drum 34, the wash oil flash drum 70, the warm flash drum 80, the cold flash drum 90, the cold stripper 110, the warm stripper 190, the wash oil stripper 60, the hot stripper 150, the debutanizer column 140, the main fractionation column 200 or the product fractionation column 170 by virtue of a recycle separated line 102.

It is critical that the lead SHC reactor 12 is not in downstream communication with the forenamed separator through a hydrocarbon transport line and particularly through the recycle separated line 102. Communication of the subsequent reactor 14 with the lead SHC reactor 12 through the cold overhead line 52 is permitted because hydrocarbons that can be converted in the SHC reactor 12 will not be present in the cold vapor stream. We have found that the recycle of a heavy aromatic stream to the subsequent SHC reactor 14 improves stability in terms of reduction of production of mesophase which leads to coking and increased selectivity to naphtha and diesel, which are the fuel products of value. However, we have found that recycle of the heavy aromatic stream to the lead SHC reactor 12 results in increased mesophase production therein. Increased mesophase can lead to coking in the SHC reactor 12 which can cause shut down of the unit. However, recycle of the heavy aromatic stream to the subsequent SHC reactor 14 through a hydrocarbon transport line such as the pitch recycle line 184, the slop wax recycle line 188 through the recycle separated line 102 serves to suppress generation of mesophase in the hydroprocessing section 10.

Figure 2:
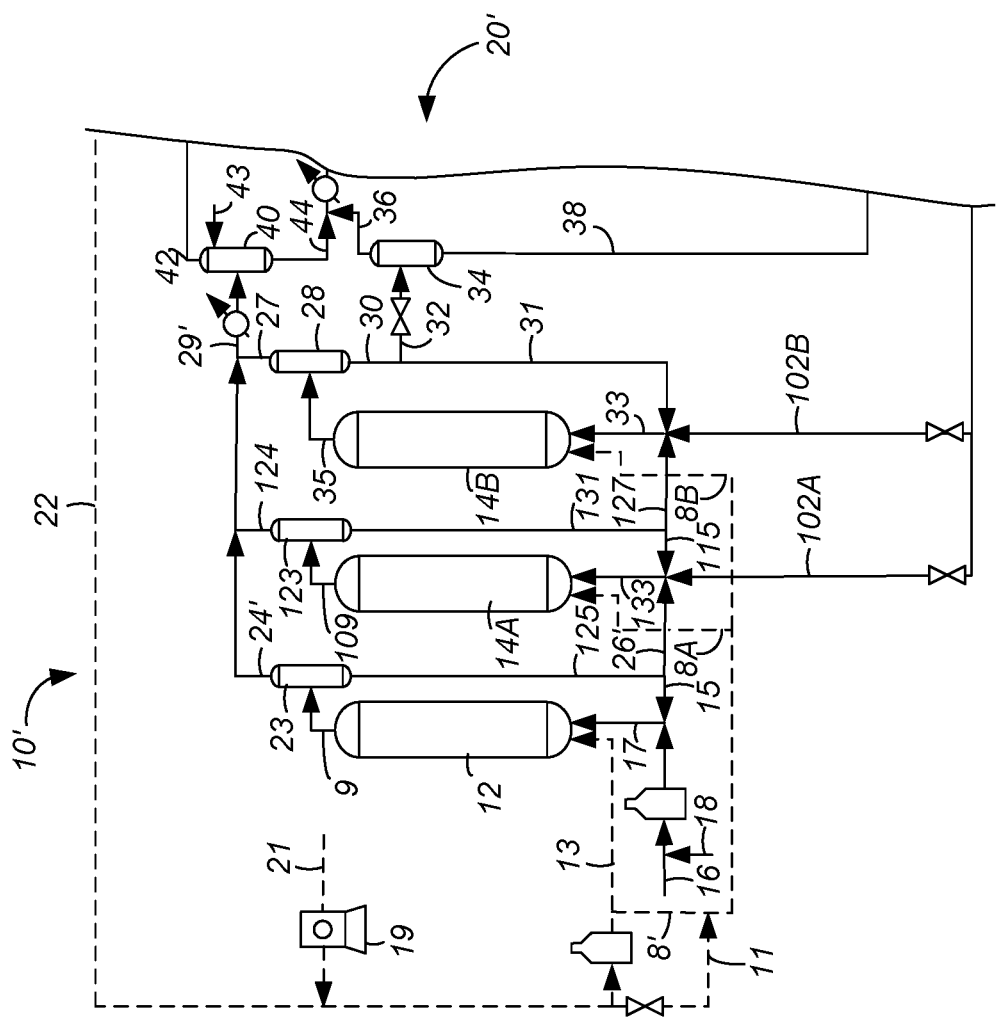
FIG. 2 is an alternative flow diagram to FIG. 1.

FIG. 2 illustrates an embodiment with more than one subsequent reactor 14A, 14B. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

A primary liquid feed effluent stream in a primary feed liquid effluent line 26' taken from the hydrocracked effluent stream in the lead effluent line 9 as in FIG. 1 is optionally mixed with a recycle separated stream in a recycle separated line 102A and a primary recycle subsequent effluent stream in a primary recycle subsequent effluent line 115 and fed in a primary subsequent feed line 133 to a primary subsequent slurry hydrocracking reactor 14A in downstream communication with the lead SHC reactor 12. Alternatively, a recycle separated stream in a recycle separated line 102B, a secondary recycle subsequent effluent stream in a secondary recycle subsequent effluent line 31 and a secondary liquid feed effluent stream in a secondary feed liquid effluent line 127 are fed in a secondary subsequent feed line 33 to a secondary subsequent slurry hydrocracking reactor 14B in downstream communication with the lead SHC reactor 12. All or either of the recycle separated streams in the recycle separated line 102A or 102B may be recycled to the respective subsequent SHC reactor 14A or 14B, but not to the lead SHC reactor 12. The lead hydrocracked effluent stream in the lead effluent line 9 may be recycled to the primary subsequent slurry hydrocracking reactor 14A in the primary feed liquid effluent line 26' without separation in the lead effluent separator 23. The primary liquid feed effluent stream in the primary liquid feed effluent line 26' may be taken from the lead hydrocracked effluent stream in the lead effluent line 9. Moreover, the primary liquid feed effluent stream in the primary liquid feed effluent line 26' may be taken from a primary liquid effluent stream in a primary lead bottoms line 125. A primary subsequent hydrogen stream in a primary subsequent hydrogen line 8A taken from a subsequent hydrogen stream in a subsequent hydrogen line 8' taken from a recycle gas stream in a recycle gas line 22 can be fed to the primary subsequent SHC reactor 14A. A secondary subsequent hydrogen stream in a secondary subsequent hydrogen line 8B taken from a subsequent hydrogen stream in a subsequent hydrogen line 8' can be fed to the secondary subsequent SHC reactor 14B. The lead slurry hydrocracking reactor 12 is out of downstream communication with the subsequent SHC reactor 14 through a hydrocarbon transport line.

A primary subsequent hydrocracked effluent stream exits the primary subsequent SHC reactor 14A in a primary subsequent effluent line 109 and may be separated in a primary subsequent effluent separator 123 to provide a primary vaporous hydrocracked effluent stream in a primary subsequent overhead line 124 extending from a top of the primary subsequent effluent separator 123 and a primary liquid hydrocracked effluent stream in a primary subsequent bottoms line 131 extending from a bottom of the primary subsequent effluent separator. The primary vaporous hydrocracked effluent stream in the primary subsequent overhead line 124 along with the vaporous hydrocracked effluent stream in a lead overhead line 24' from the lead effluent separator 23 may be forwarded to the wash oil separator 40 perhaps through the mixed overhead line 29'. The primary subsequent effluent separator 123 is operated at about the same temperature and pressure of the primary subsequent SHC reactor 14A. The liquid effluent stream in the primary subsequent bottoms line 131 is split into a primary recycle effluent stream in a primary recycle effluent line 115 and a secondary liquid feed effluent stream in a secondary liquid feed effluent line 127 taken from the primary subsequent hydrocracked effluent stream in the primary subsequent effluent line 109. The recycle effluent stream in a primary recycle effluent line 115 is mixed with the primary liquid feed effluent stream in the primary feed liquid effluent line 26' and optionally the recycle separated stream in the recycle separated line 102A and fed to the primary subsequent SHC reactor 12 in the primary subsequent feed line 133. The secondary liquid feed effluent stream in the secondary feed liquid effluent line 127 is optionally mixed with a recycle separated stream in a recycle separated line 102B and a secondary recycle subsequent effluent stream in a secondary recycle subsequent effluent line 31 and fed in secondary subsequent feed line 33 to the secondary subsequent slurry hydrocracking reactor 14B in downstream communication with the lead SHC reactor 12 and the primary subsequent SHC reactor 14A. The primary subsequent hydrocracked effluent stream in the primary subsequent effluent line 109 may be fed to the secondary subsequent slurry hydrocracking reactor 14B in the secondary feed liquid effluent line 127 without separation in the primary subsequent effluent separator 123. The secondary liquid feed effluent stream in the secondary liquid feed effluent line 127 may be taken from the primary subsequent hydrocracked effluent stream in the primary subsequent effluent line 109. Moreover, the secondary subsequent liquid feed effluent stream in the secondary subsequent liquid feed effluent line 127 may be taken from the primary subsequent liquid effluent stream in the lead bottoms line 131. The secondary subsequent hydrogen stream in the secondary subsequent hydrogen line 8B taken from the recycle gas stream in the recycle gas line 22 can be fed to the secondary subsequent SHC reactor 14B. The lead slurry hydrocracking reactor 12 is out of downstream communication with the secondary subsequent SHC reactor 14B through a hydrocarbon transport line. A secondary subsequent hydrocracked effluent stream exits the secondary subsequent SHC reactor 14B in a secondary subsequent effluent line 35 and is fed to the separation section 20 as explained for FIG. 1. Operation and configuration of the embodiment of the rest of FIG. 2 is as is described for FIG. 1

EXAMPLES

The following examples show that recycling unconverted pitch to the second slurry hydrocracking reactor in series improves stability.

Example 1

To simulate the addition of unconverted vacuum residue to the first reactor in series, a pair of batch autoclave runs with continuous gas flow were performed. Five hundred grams of Urals vacuum residue and 300 wppm molybdenum in the form of molybdenum octoate catalyst was added to a batch autoclave. The lead reactor was operated at 450° C., 16.6 MPa (g) (2400 psig). Running the batch reactor with Urals vacuum residue for 80 minutes resulted in 87.4% pitch conversion and a mesophase measurement of less than 0.03% in the reactor liquid Adding additional 260 g of fresh Urals vacuum residue to the reactor and running the experiment for an additional 40 minutes at the same conditions to simulate adding pitch back to the lead SHC reactor in a series of two SHC reactors resulted in an increase of the mesophase to 0.09%. Mesophase was quantified in the reactor liquid by extracting the toluene insoluble fraction, determining the percentage of toluene insoluble material that was reflective to polarized light and multiplying the percentage of toluene insoluble material that was reflective to polarized light by the wt % of toluene insoluble in the reactor liquid.

Example 2

Arab Light vacuum residue fed continuously to two SHC reactors in series with an interstage separator between the reactors was simulated by two consecutive, single SHC runs to achieve 95% overall conversion of pitch boiling at or over 524° C. (975° F.) to products boiling below 524° C. (975° F.). The feed rate of vacuum resid to a SHC reactor during the first run constituted an LHSV of 0.61 hr$^{-1}$, a hydrogen flow rate to the reactor was 757 Nm$^3$/m$^3$ oil (4494 SCF/bbl oil) with a 90 wt % hydrogen purity and the reactor was operated at 450° C. (842° F.) and 17.9 MPa (g) (2600 psig). Molybdenum octoate catalyst was added at a concentration of 500 wppm molybdenum to the vacuum resid fed to the SHC reactor. Hydrocracked effluent from the SHC reactor from the first run was fractionated into components which were selectively blended to simulate the composition of a liquid hydrocracked effluent separated in a lead effluent separator in the first run. The simulated liquid hydrocracked effluent was fed to the SHC reactor to constitute an LHSV of 0.32 hr$^{-1}$ and operated at the same pressure as the SHC reactor in the first run but at a hydrogen rate of 1685 Nm$^3$/m$^3$ oil (10,000 SCF/bbl oil) with 90% hydrogen purity and a temperature of 454° C. (850° F.). The SHC reactor had 0.048% mesophase without recycle. When unconverted vacuum residue was recycled to the SHC reactor at a recycle rate of 0.69 times the reactor feed rate, the mesophase in the SHC reactor decreased to 0.037%.

The examples are provided for illustrative purposes only, and are not meant to limit the various embodiments described herein in any way.

Specific Embodiments

While the following is described in conjunction with specific embodiments, it will be understood that this description is intended to illustrate and not limit the scope of the preceding description and the appended claims.

A first embodiment of the invention is a process for slurry hydrocracking comprising slurry hydrocracking a heavy hydrocarbon feed stream in a lead slurry hydrocracking reactor to provide a hydrocracked effluent stream; slurry hydrocracking an effluent stream taken from the hydrocracked effluent stream and a recycle separated stream in a subsequent slurry hydrocracking reactor to provide a subsequent hydrocracked effluent stream; separating the subsequent hydrocracked effluent stream into a recycle separated stream; and recycling the recycle separated stream to the subsequent slurry hydrocracking reactor. An embodiment of the invention is one, any or all of prior embodiments in this paragraph up through the first embodiment in this paragraph further comprising taking the recycle separated stream from a bottom of a fractionation column. An embodiment of the invention is one, any or all of prior embodiments in this paragraph up through the first embodiment in this paragraph wherein the fractionation column is operated at vacuum pressure. An embodiment of the invention is one, any or all of prior embodiments in this paragraph up through the first embodiment in this paragraph further comprising taking a second recycle separated stream from a side of the fractionation column. An embodiment of the invention is one, any or all of prior embodiments in this paragraph up through the first embodiment in this paragraph further comprising separating the hydrocracked effluent stream into a vapor effluent stream and the liquid effluent stream. An embodiment of the invention is one, any or all of prior embodiments in this paragraph up through the first embodiment in this paragraph further comprising splitting the liquid effluent stream into a recycle effluent stream and a liquid feed effluent stream; recycling the recycle effluent stream to the lead slurry hydrocracking reactor and feeding the liquid feed effluent stream to the subsequent slurry hydrocracking reactor. An embodiment of the invention is one, any or all of prior embodiments in this paragraph up through the first embodiment in this paragraph further comprising separating the subsequent hydrocracked effluent stream into a vapor subsequent effluent stream and a liquid subsequent effluent stream and splitting the liquid subsequent effluent stream into a recycle subsequent effluent stream and a process subsequent hydrocracked effluent stream; recycling the recycle subsequent effluent stream to the subsequent slurry hydrocracking reactor and further separating the process subsequent hydrocracked effluent stream to provide the recycle separated stream. An embodiment of the invention is one, any or all of prior embodiments in this paragraph up through the first embodiment in this paragraph further comprising separating, stripping and fractionating the process subsequent effluent stream to provide the recycle separated stream. An embodiment of the invention is one, any or all of prior embodiments in this paragraph up through the first embodiment in this paragraph further comprising taking the recycle separated stream from a side of a fractionation column. An embodiment of the invention is one, any or all of prior embodiments in this paragraph up through the first embodiment in this paragraph further comprising at least two subsequent slurry hydrocracking reactors. An embodiment of the invention is one, any or all of prior embodiments in this paragraph up through the first embodiment in this paragraph further comprising bypassing the recycle separated stream around the lead slurry hydrocracking reactor.

A second embodiment of the invention is an apparatus for slurry hydrocracking comprising a lead slurry hydrocracking reactor; a subsequent slurry hydrocracking reactor in downstream communication with the lead slurry hydrocracking reactor; a separator in downstream communication with the subsequent slurry hydrocracking reactor; and the subsequent slurry hydrocracking reactor in downstream communication with the separator. An embodiment of the invention is one, any or all of prior embodiments in this paragraph up through the second embodiment in this paragraph wherein the lead slurry hydrocracking reactor is not in downstream communication with the recycle separated stream. An embodiment of the invention is one, any or all of prior embodiments in this paragraph up through the second embodiment in this paragraph further comprising a separator in downstream communication with the subsequent slurry hydrocracking reactor; a stripper column in downstream communication with the separator and a fractionation column in downstream communication with the stripper column; and the subsequent slurry hydrocracking reactor is in downstream communication with the fractionation column. An embodiment of the invention is one, any or all of prior embodiments in this paragraph up through the second embodiment in this paragraph further comprising a flash drum in downstream communication with the separator and the stripper column is in downstream communication with the flash drum. An embodiment of the invention is one, any or all of prior embodiments in this paragraph up through the second embodiment in this paragraph further comprising at least two subsequent slurry hydrocracking reactors.

A third embodiment of the invention is a process for slurry hydrocracking comprising slurry hydrocracking a heavy hydrocarbon feed in a lead slurry hydrocracking reactor to provide a hydrocracked effluent stream; slurry hydrocracking a liquid effluent stream taken from the hydrocracked effluent stream and a recycle separated stream in a subsequent slurry hydrocracking reactor to provide a subsequent hydrocracked effluent stream; separating the subsequent hydrocracked effluent stream into a separated hydrocracked effluent stream; fractionating the separated hydrocracked effluent stream to provide a fractionated effluent stream; and recycling a recycle separated stream taken from the fractionated effluent stream to the subsequent slurry hydrocracking reactor. An embodiment of the invention is one, any or all of prior embodiments in this paragraph up through the third embodiment in this paragraph further comprising taking the recycle separated stream from a bottom of a fractionation column. An embodiment of the invention is one, any or all of prior embodiments in this paragraph up through the third embodiment in this paragraph wherein the fractionation column is operated at vacuum pressure.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for slurry hydrocracking comprising:
slurry hydrocracking a heavy hydrocarbon feed stream in a lead slurry hydrocracking reactor to provide a hydrocracked effluent stream;
slurry hydrocracking an effluent stream taken from said hydrocracked effluent stream and a recycle separated stream in a subsequent slurry hydrocracking reactor to provide a subsequent hydrocracked effluent stream;
separating said subsequent hydrocracked effluent stream into said recycle separated stream; and
recycling said recycle separated stream to a bottom of said subsequent slurry hydrocracking reactor.
2. The process of claim 1 further comprising taking said recycle separated stream from a bottom of a fractionation column.
3. The process of claim 2 wherein said fractionation column is operated at vacuum pressure.
4. The process of claim 2 further comprising taking a second recycle separated stream from a side of said fractionation column.
5. The process of claim 1 further comprising separating said hydrocracked effluent stream into a vapor effluent stream and said liquid effluent stream.
6. The process of claim 5 further comprising splitting said liquid effluent stream into a recycle effluent stream and a liquid feed effluent stream; recycling said recycle effluent stream to said lead slurry hydrocracking reactor and feeding said liquid feed effluent stream to said subsequent slurry hydrocracking reactor.
7. The process of claim 6 further comprising separating said subsequent hydrocracked effluent stream into a vapor subsequent effluent stream and a liquid subsequent effluent stream and splitting said liquid subsequent effluent stream into a recycle subsequent effluent stream and a process subsequent hydrocracked effluent stream; recycling said recycle subsequent effluent stream to said subsequent slurry hydrocracking reactor and further separating said process subsequent hydrocracked effluent stream to provide said recycle separated stream.

8. The process of claim 7 further comprising separating, stripping and fractionating said process subsequent effluent stream to provide said recycle separated stream.

9. The process of claim 1 further comprising taking said recycle separated stream from a side of a fractionation column.

10. The process of claim 1 further comprising at least two subsequent slurry hydrocracking reactors.

11. The process of claim 1 further comprising bypassing said recycle separated stream around said lead slurry hydrocracking reactor.

12. An apparatus for slurry hydrocracking comprising:
a lead slurry hydrocracking reactor;
a subsequent slurry hydrocracking reactor in downstream communication with said lead slurry hydrocracking reactor;
a separator in downstream communication with said subsequent slurry hydrocracking reactor; and
said subsequent slurry hydrocracking reactor in downstream communication with said separator;
said lead slurry hydrocracking reactor is not in downstream communication with said separator.

13. The apparatus of claim 12 further comprising a separator in downstream communication with said subsequent slurry hydrocracking reactor; a stripper column in downstream communication with said separator and a fractionation column in downstream communication with said stripper column; and said subsequent slurry hydrocracking reactor is in downstream communication with said fractionation column.

14. The apparatus of claim 13 further comprising a flash drum in downstream communication with said separator and said stripper column is in downstream communication with said flash drum.

15. The apparatus of claim 12 further comprising at least two subsequent slurry hydrocracking reactors.

16. A process for slurry hydrocracking comprising:
slurry hydrocracking a heavy hydrocarbon feed in a lead slurry hydrocracking reactor to provide a hydrocracked effluent stream;
slurry hydrocracking a liquid effluent stream taken from said hydrocracked effluent stream and a recycle separated stream in a subsequent slurry hydrocracking reactor to provide a subsequent hydrocracked effluent stream;
separating said subsequent hydrocracked effluent stream into a separated hydrocracked effluent stream;
stripping and fractionating said separated hydrocracked effluent stream to provide a fractionated effluent stream; and
recycling a recycle separated stream taken from said fractionated effluent stream to said subsequent slurry hydrocracking reactor.

17. The process of claim 16 further comprising taking said recycle separated stream from a bottom of a fractionation column.

18. The process of claim 16 wherein said fractionation column is operated at vacuum pressure.

* * * * *